Figure 5:
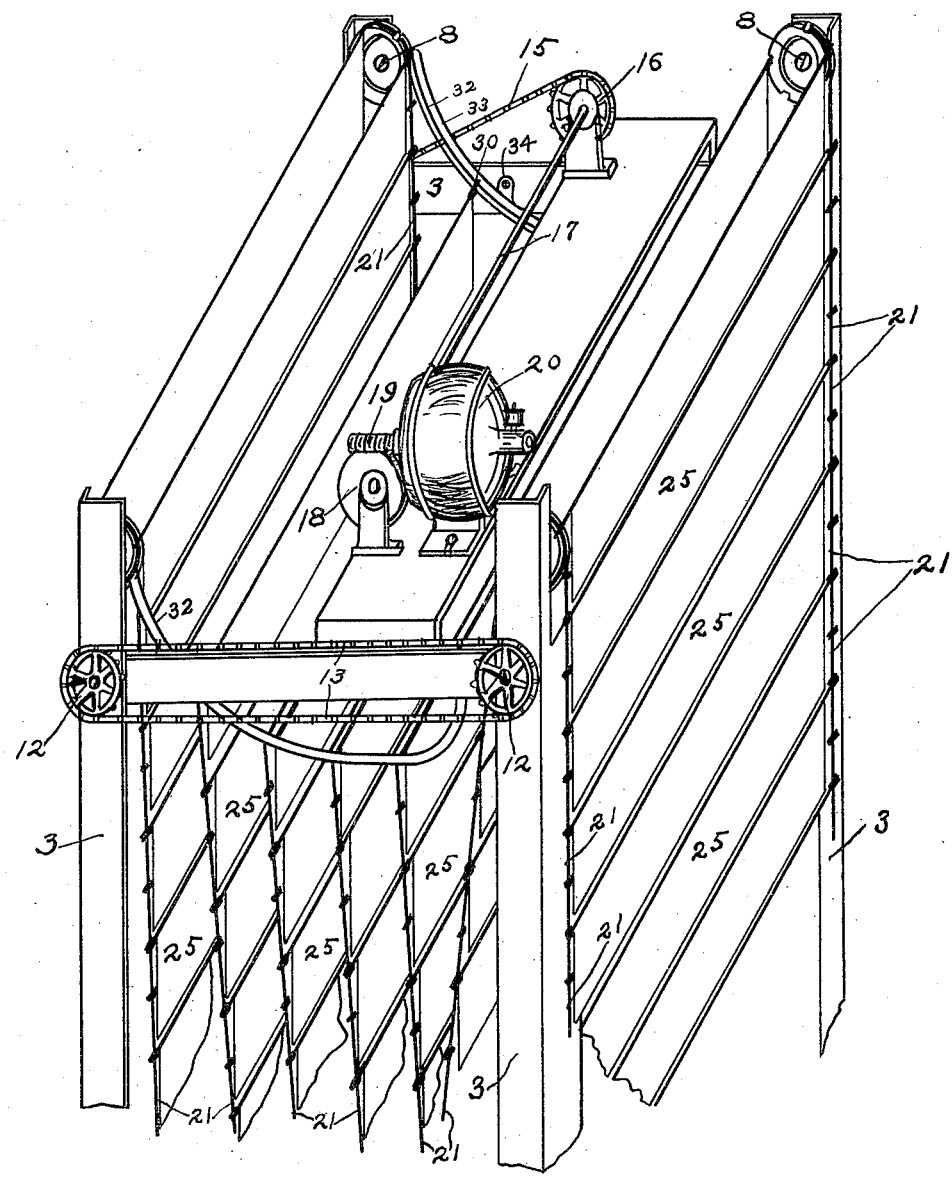

J. W. MEVIS.
ADVERTISING DEVICE.
APPLICATION FILED OCT. 19, 1908.
1,078,742.
Patented Nov. 18, 1913.
6 SHEETS—SHEET 1.
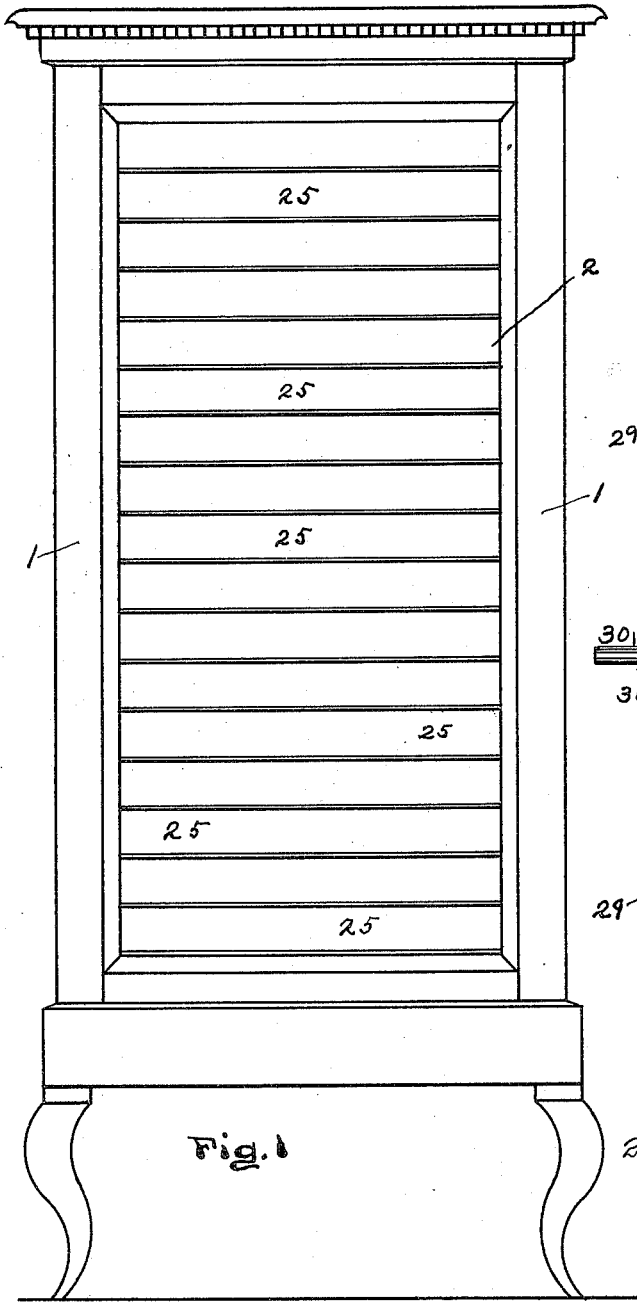
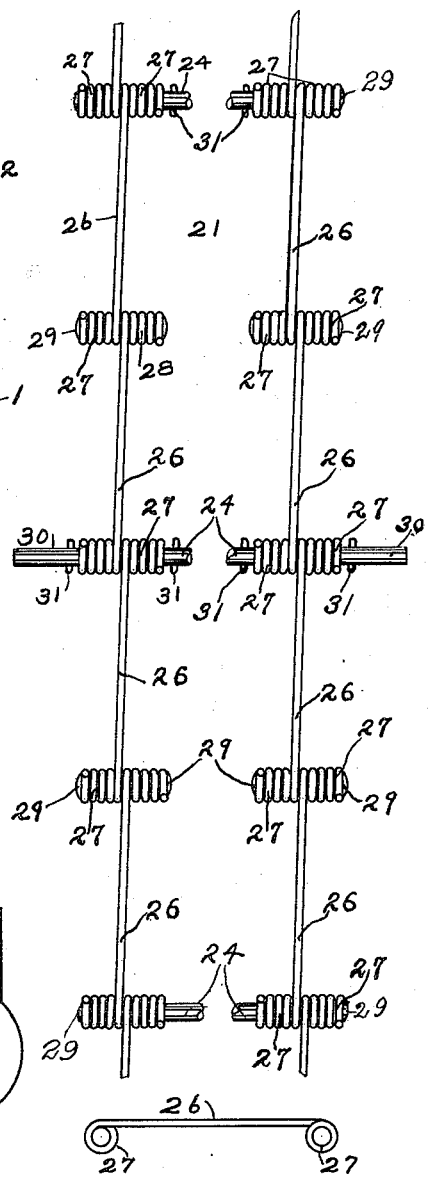

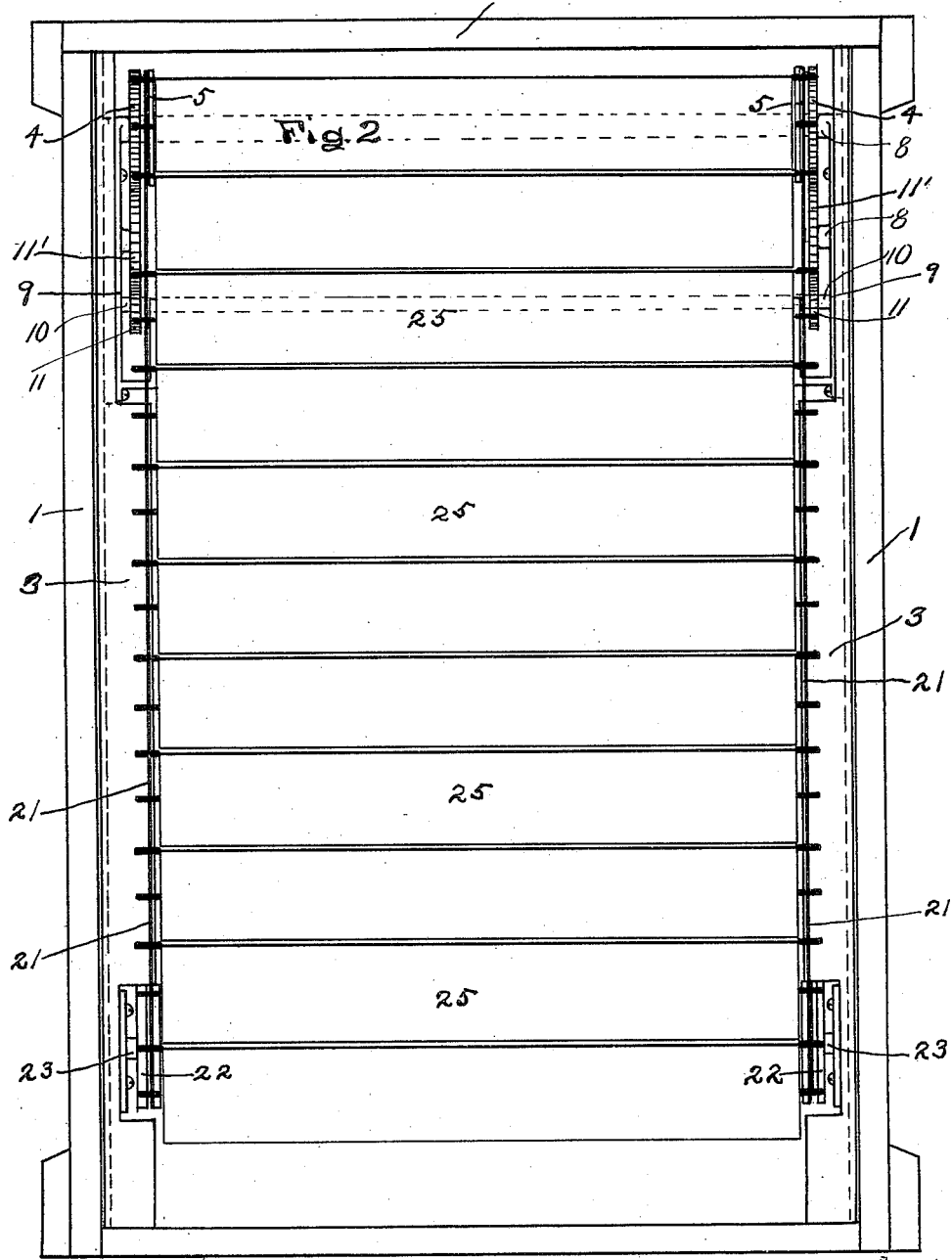

J. W. MEVIS.
ADVERTISING DEVICE.
APPLICATION FILED OCT. 19, 1908.
1,078,742.
Patented Nov. 18, 1913.
6 SHEETS—SHEET 3.
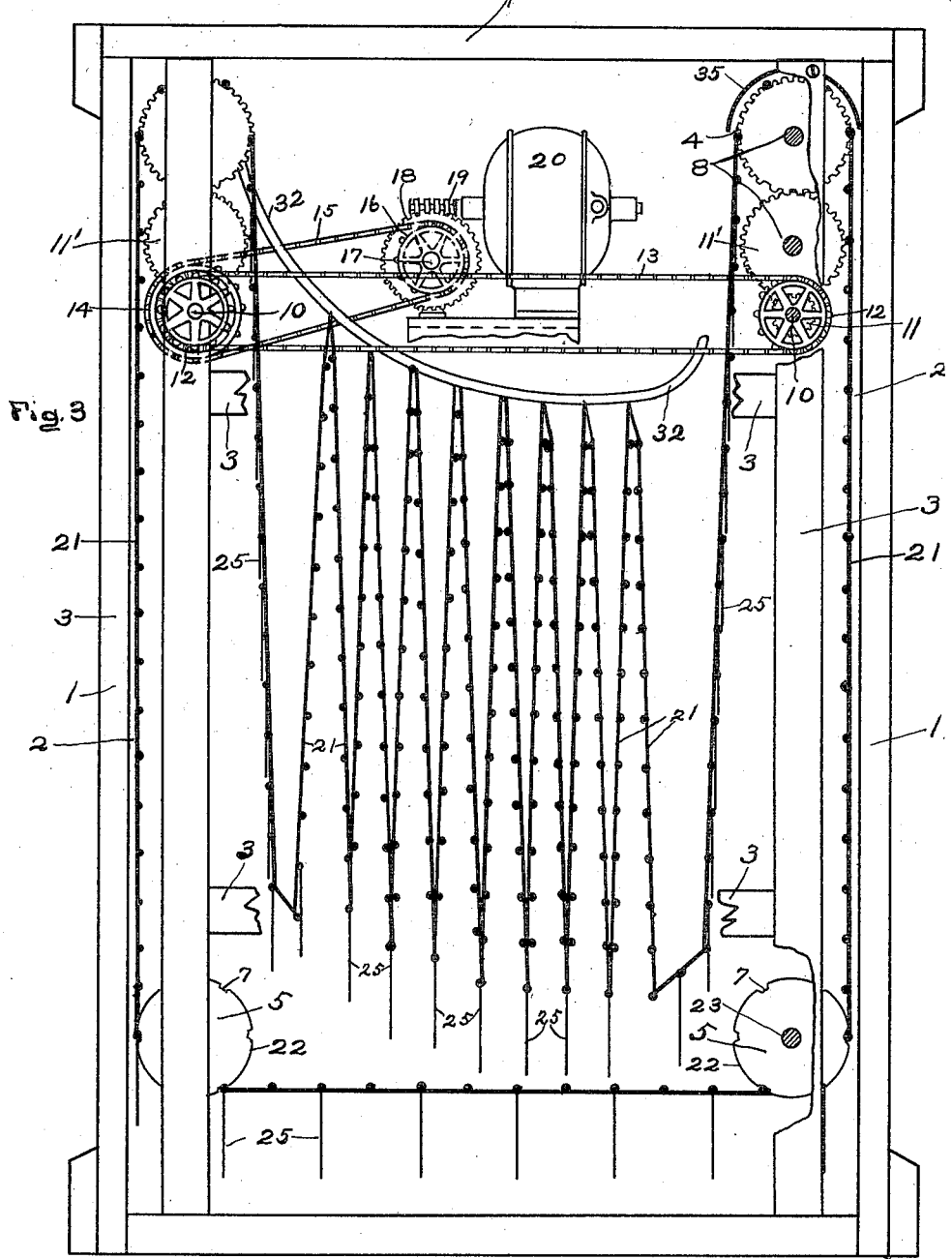

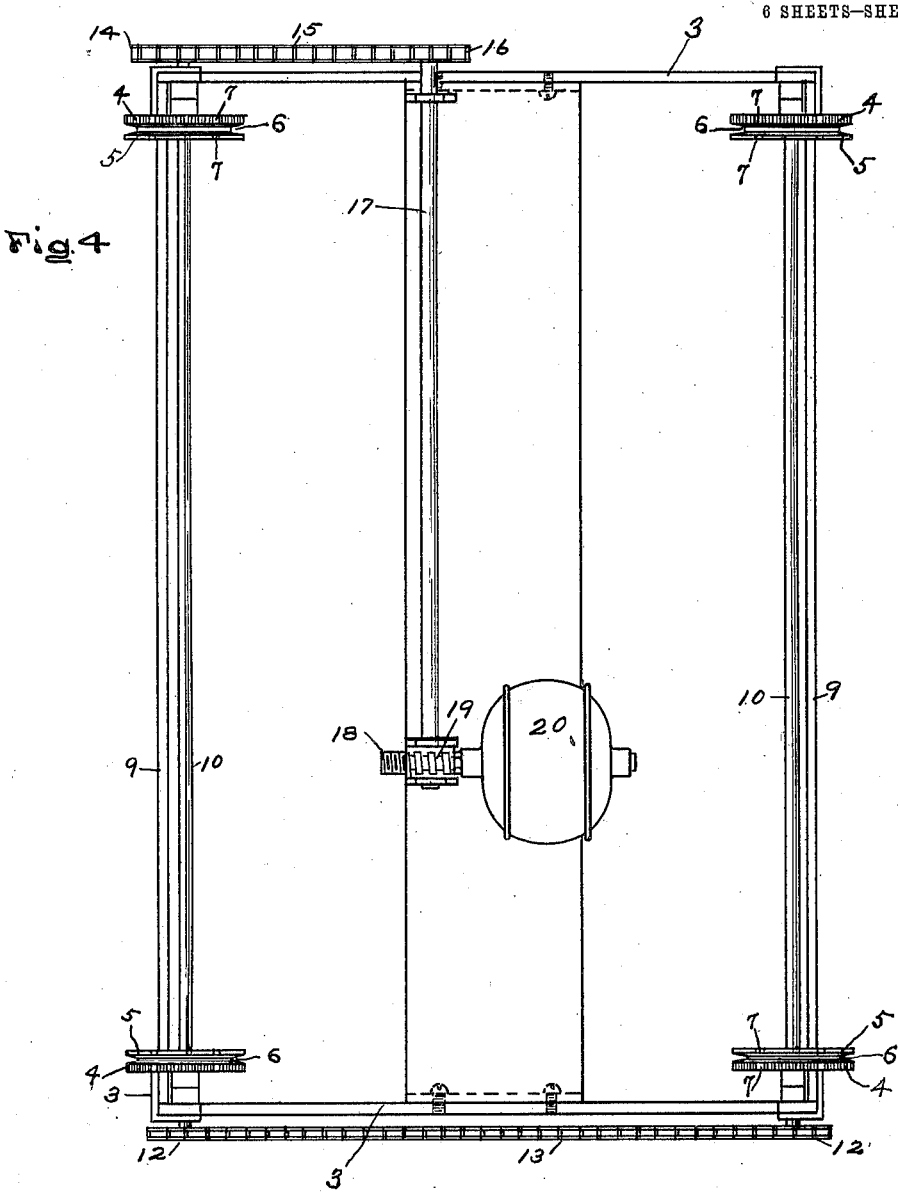

J. W. MEVIS.
ADVERTISING DEVICE.
APPLICATION FILED OCT. 19, 1908.

1,078,742.

Patented Nov. 18, 1913.
6 SHEETS—SHEET 5.

J. W. MEVIS.
ADVERTISING DEVICE.
APPLICATION FILED OCT. 19, 1908.
1,078,742.
Patented Nov. 18, 1913.
6 SHEETS—SHEET 6.
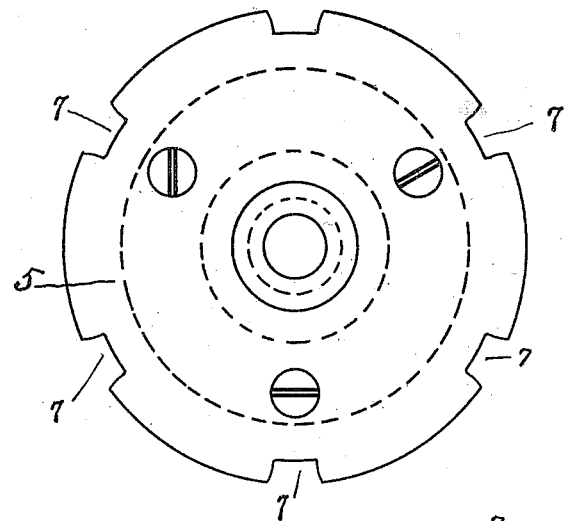
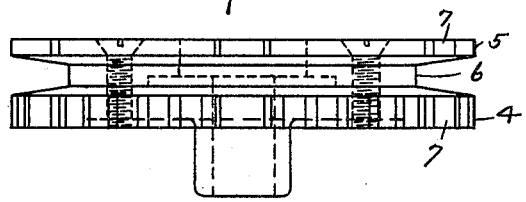
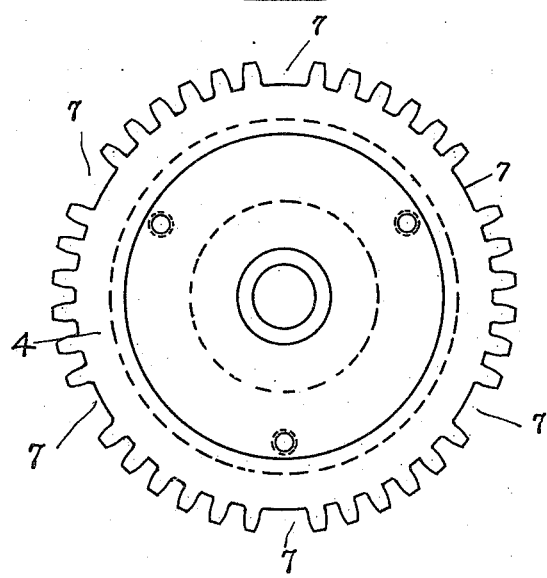

UNITED STATES PATENT OFFICE.

JOHN W. MEVIS, OF LOWELL, MASSACHUSETTS.

ADVERTISING DEVICE.

1,078,742.  Specification of Letters Patent.  Patented Nov. 18, 1913.

Application filed October 19, 1908.  Serial No. 458,422.

*To all whom it may concern:*

Be it known that I, JOHN W. MEVIS, a citizen of the United States, residing at Lowell, in the county of Middlesex and State of Massachusetts, have invented certain new and useful Improvements in Advertising Devices; and I do hereby declare the following to be a full, clear, and exact description of the invention, such as will enable others skilled in the art to which it appertains to make and use the same.

This invention relates to improvements in display apparatus, and is more particularly concerned with devices for advertising purposes.

The object of the present invention is the provision of an advertising machine capable of displaying in regular succession a series of advertising cards or forms, and to the end that the machine may have a maximum capacity the invention has in view such an arrangement of the parts that the cards or forms may be compactly stored within the machine after their successive exposure to view through the machine casing, thereby enabling a large number of cards or forms to be employed without undue enlargement of the machine casing, or extensive floor space for accommodating the machine.

The invention further aims to provide simple and efficient means for causing display of the cards or forms, which means are of such character as to readily fold within the casing of the machine, thus permitting the cards or forms to be positioned in nested relation within the machine during a determinate period of their transit, relieving the driving mechanism during such period of the propulsive strain, and economizing in the expenditure of power for driving the displaying means.

A further object of the present invention is the provision of an advertising device in which continuous motion is imparted to the cards or forms while the same are being exhibited, thereby presenting to the observer a constantly-changing display of advertising data.

With these general objects in view, and others that will appear as the nature of the improvements is better understood, the invention consists substantially in the novel construction, combination and arrangement of parts hereinafter fully described, illustrated in the accompanying drawings, and pointed out in the appended claims.

In the drawings—Figure 1 is a front elevation of an advertising device constructed in accordance with and embodying the principles of the present invention. Fig. 2 is a similar view the front of the casing being removed. Fig. 3 is a side elevation, the casing being also removed, viewing the machine from the side thereof at which the motor is located. Fig. 4 is a top plan view of the driving mechanism. Fig. 5 is a perspective view of the driving mechanism and the connected gearing. Fig. 6 is a side elevation of one of the combined sprockets and gears employed for driving the conveyer. Fig. 7 is an elevation similar to Fig. 6, viewing the sprocket and gear from the reverse side. Fig. 8 is an edge elevation of the construction illustrated in Figs. 6 and 7. Fig. 9 is a detail view, on an enlarged scale, of a portion of the conveyer for the display cards or forms.

Referring in detail to the drawings, the numeral 1 designates the casing of the herein-described device. This casing may be formed of any suitable material, and it may have any desired contour or configuration, but is preferably in the form of a rectangular inclosure, being provided at its front and back with openings 2 through which the advertising cards or forms, to be hereinafter referred to with greater particularity, are exposed to view.

Within the casing 1 is a suitable frame work 3, and upon this frame work is sustained the driving mechanism and other operative parts of the device.

The driving mechanism includes a plurality of gears, illustrated in detail in Figs. 6, 7 and 8, and by referring to these figures it will be observed that each of the same comprehends a spur gear 4 with which is associated a sprocket 5, and between the gear 4 and sprocket 5 is an annular V-shaped groove 6, the purpose of which will presently appear. Preferably, the gear 4 and the sprocket 5 are formed as an integral structure, but it will be obvious that the same might be separate structures suitably connected together and spaced apart to provide the groove 6. The periphery of the gears 4 and sprockets 5 is provided at intervals with notches 7, and the notches 7 of the gears 4 are coincident with the notches of the sprockets 5. The purpose of this will also presently appear.

A pair of the combined sprockets and gears is arranged at the top of the front and back of the machine, each of these being mounted upon studs 8, and each of these pairs is carried by a substantially U-shaped frame 9 carried by the frame work 3. Hence it will be seen that the sprockets and gears of each pair are held in alinement with each other transversely of the machine, so that the same will rotate in unison. For this purpose a driving shaft 10 is journaled in each of the frames 9 below the studs 8, and each of these shafts is provided with a pair of pinions 11 that engage idler gears 11', which latter mesh with the gears 4 immediately thereabove. That the shafts 10 may rotate in unison with each other the ends of said shafts, at one side of the machine, are provided with sprocket wheels 12, said wheels being connected by a sprocket chain 13, and this chain receives its motion from the driving shaft 10 at the front of the machine, which shaft is provided at the end thereof opposite to the sprocket 12 with a sprocket wheel 14. Connected to the wheel 14 is a sprocket chain 15, which travels over a sprocket wheel 16 carried by a main driving shaft 17 upon which is mounted a worm wheel 18. This worm wheel is in mesh with a worm 19 that is driven by a motor 20. The latter is preferably an electric motor, but it is perfectly obvious that any other form of motor might be substituted therefor. It will thus be seen that when the motor 20 is in operation motion is communicated therefrom through the sprocket wheel 16, chain 15, and sprocket wheel 14 to the driving shaft 10 at the front of the machine, and from the latter to the driving shaft 10 at the back of the machine, and by reason of these shafts being in engagement, through the pinions 11 and idler gears 11' with the combined sprockets and gears, it is also evident that these latter rotate together.

An endless conveyer 21, through the medium of which the advertising cards or forms are caused to travel through the machine, passes over the combined sprockets and gears, and also travels over a plurality of idler gears 22 arranged at the bottom of the machine, these gears being mounted upon studs 23. The sprockets 22 are substantially the same as the combined sprockets and gears at the top of the machine, but are not provided with the gear teeth, inasmuch as the sprockets 22 merely support and guide the conveyer 21 in the movement of the latter at the bottom of the machine.

The conveyer 21, as clearly illustrated in Fig. 9, comprises a plurality of suspending rods 24 spaced sufficiently apart to receive an advertising card or form 25, and said cards or forms may be detachably connected to the rods 24. The rods 24 are connected through the medium of wire links 26 the ends of each of which are coiled in opposite directions in order to provide oppositely projecting eyes 27 which extend in the plane of the conveyer. The eye at one end of each of these links 26 receives one end of one of the rods 24, and thus provides a bearing therefor, while the eye at the other end receives a connecting stud 28, these studs being arranged between the suspending rods 24 in order to impart to the conveyer 21, as an entirety, a greater degree of flexion, and hence ability to pass over the sprockets and gears, as well as to fold, as will appear hereinafter, to permit storage of the unexposed cards or forms. The ends of the rods 24, and also the ends of the studs 28 are upset or headed, as at 29, in order to hold the eyes 27 thereon, and said eyes provide bearing surfaces that find lodgment in the notches 7 of the gears and sprockets 4 and 5, and likewise the sprockets 22, as they pass thereover. During this passage, however, the links 26 are received by the grooves 6 of the sprockets and gears, so that this engagement prevents lateral displacement of the conveyer 21 from the sprockets and gears, and insures uniform guiding of the conveyer thereover.

At uniform intervals throughout the length of the conveyer 21, say, for example, every fifteenth rod, certain of the rods 24 have their ends prolonged, as at 30, and said prolonged ends, and likewise all of the rods 24 adjacent to the inner eye 27, are provided with stops 31 by which movement of the eyes 27 longitudinally of the rods 24 is prevented.

The purpose of the prolonged ends 30 of the rods 24 is to cause the cards or forms 25 between the same to become nested in the machine after their exposure at the opening 2 at the front of the machine. To accomplish this end a pair of inclined guides 32 is provided at the upper portion of the machine, and arranged between the gears and sprockets at the front and back thereof. Each of these guides 32 has a shield 33 associated therewith, which shield is provided with attaching lugs 34 by which the shield is connected to the frame work, and sustained thereby, and the front ends of said guides project in line with the inner edges of the combined sprockets and gears at the front of the machine. The purpose of this is to permit the rods 24 to pass down between said guides until one of the rods which is provided with the prolonged ends 30 meets the forward ends of the guides 32, at which time these prolonged ends, the length of the rod being too great to continue the downward movement, are caught by the forward ends of the guides 32, and pass down the latter. By reason of this the conveyer 21 is supported in pendant loops of uniform length by the guides 32, for substantially the length of the casing, which loops, however, gradually advance from the front to the rear of the machine, by reason of the inclination of the guides 32, whence they rise to the top of the machine, and the rods 24 pass over the combined sprockets and gears at the top of the back of the machine. The nested relation of the cards or forms is clearly illustrated in Fig. 3, and this nesting provides a maximum storage of the unexhibited cards or forms, so that the number of the cards or forms to be exhibited by the machine may be exceedingly large, giving to the machine capacity for exhibiting these cards or forms in regular succession for a prolonged period before the entire group of the cards or forms is exhausted.

If desired, guards 35 may be employed for the combined sprockets and gears, but this is not essential.

In the operation of the hereindescribed machine an advertisement is placed upon each side of each of the cards or forms 25. This advertisement may be the same at both sides or each of the sides may contain a different advertisement. Inasmuch as the cards or forms are suspended from the rods 24, it is obvious that the same will always hang in a vertical position, and as the cards or forms pass the openings 2 of the casing 1 the advertising matter at the sides of the cards or forms will be successively displayed. Observers, therefore, viewing the machine from either the front or back thereof, will have presented to them the advertising matter at the sides of the cards or forms, so that in approaching the machine from either direction the same will effectually exhibit the advertisements thereof. As the motor 20 operates it propels the conveyer 21, causing the latter to move in an upward direction at the front of the machine. Those cards or forms at the front of the machine pass over the sprockets and gears at the top of the front of the machine, but remain in vertical position, as previously stated, the cards or forms passing between the sprockets and gears, and descending at the rear edges thereof. In this descension the cards or forms move down until the first rod having the prolonged ends 30 comes in contact with the guides 32, whereupon further movement of that particular portion of the conveyer in a downward direction ceases, and said rod passes down the guides 32 in order to nest the conveyer in the folds above described. After traversing the length of the guides 32 the cards or forms travel over the combined sprockets and gears at the top of the back of the machine, and pass down to be exposed to view by the opening 2 at the back of the machine. After passing this opening the cards or forms pass around the idler sprockets 22, and again ascend at the front of the machine to be again exposed to view at the latter point. This movement of the conveyer continues so long as the motor 20 is in operation. In passing over the sprockets and gears the rods 24, being seated in the recesses 7, and the links 26 being seated in the grooves 6, liability to displacement of the conveyer is wholly eliminated, so that uniform movement of the conveyer is assured.

If desired, pictorial post cards, photographs, or other matter may also be associated with the advertisements, and as the latter are successively exposed to view, this additional data will also be seen.

Having thus described the invention, what is claimed as new, and desired to be secured by Letters Patent, is:

1. In a device of the class described, a frame, wheels journaled in said frame and provided with peripheral grooves and transverse notches, an endless conveyer for displaying the matter to be exhibited, said conveyer being formed of a plurality of suspending rods and links connecting said rods, said links having oppositely-projecting eyes extending in the plane of the conveyer for receiving said suspending rods and to provide bearings therefor, the rods and links being received by the notches and grooves, respectively, of said wheels during the operation of said conveyer, and means for actuating said conveyer.

2. In a device of the class described, a frame, wheels journaled in said frame adjacent to its upper portion and at the front and back thereof, each of said wheels being provided with a peripheral groove and transverse notches, said wheels being arranged in pairs at the front and back of said frame, a driving shaft associated with each pair of said wheels and geared thereto, connections between said shafts for actuating the latter in unison, driving means connected to one of said shafts, an endless conveyer for displaying the matter to be exhibited, said conveyer being formed of a plurality of suspending rods and links connecting said rods, the rods and links being received by the notches and grooves, respectively, of said wheels during the operation of said conveyer, and inclined guides arranged at the upper portion of said frame, one end of said guides being positioned in immediate proximity to the wheels at one side of the casing, whereby to receive certain of the suspending rods as they leave said wheels to loop the conveyer during its transit through the casing, the other ends of said guides being arranged in a lower plane than the aforesaid ends to cause the looped portions of the conveyer to gravitate upon said guides.

In testimony whereof I affix my signature, in the presence of two witnesses.

JOHN W. MEVIS.

Witnesses:
GEORGE W. CONANT,
HARRY W. KNOWLTON.

Copies of this patent may be obtained for five cents each, by addressing the "Commissioner of Patents, Washington, D. C."